Jan. 15, 1935. J. E. SOONS 1,988,255
INDICATING AND OPERATING MECHANISM
Filed April 23, 1931 3 Sheets-Sheet 1
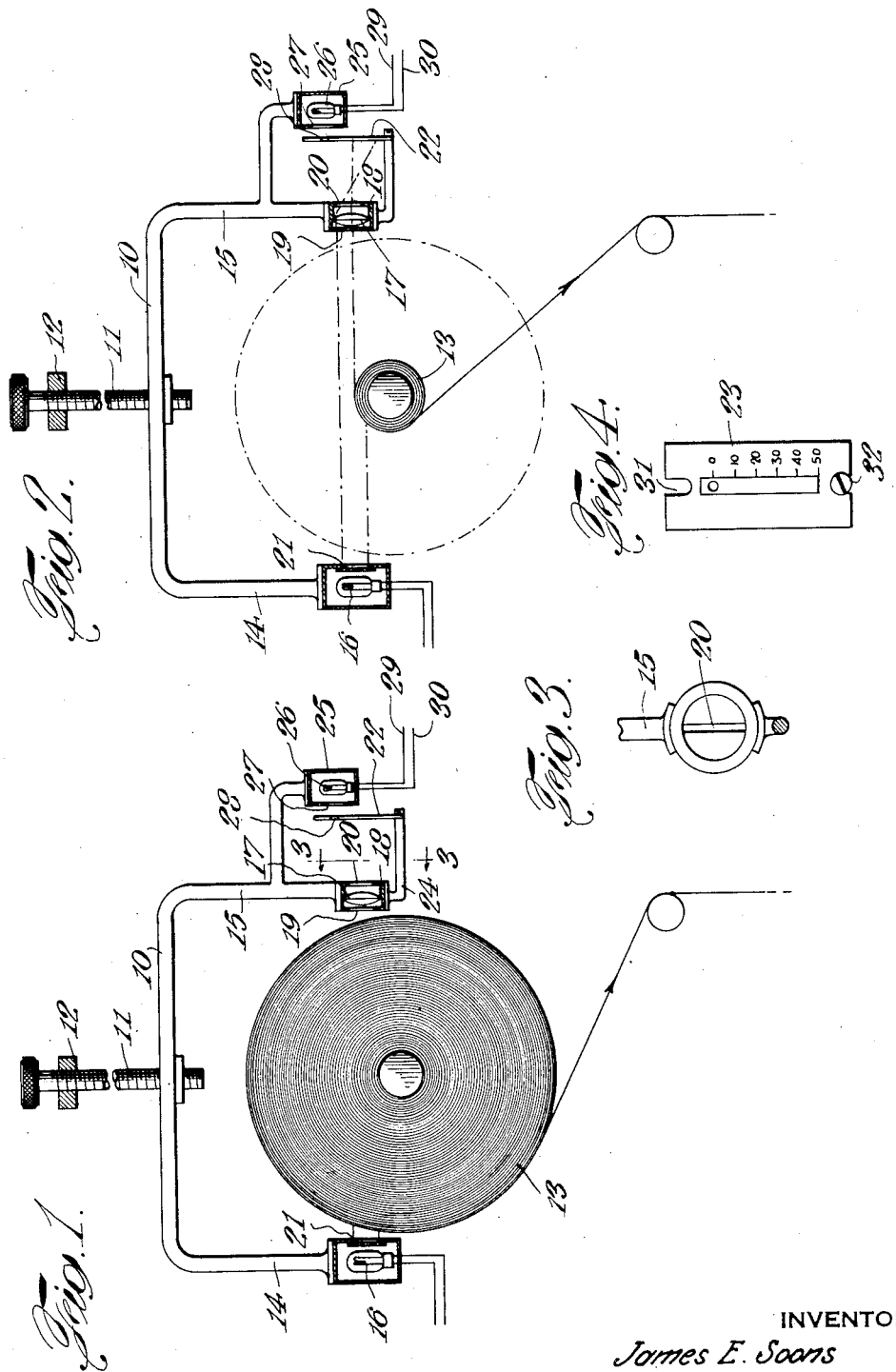
INVENTOR
James E. Soons
BY his ATTORNEYS

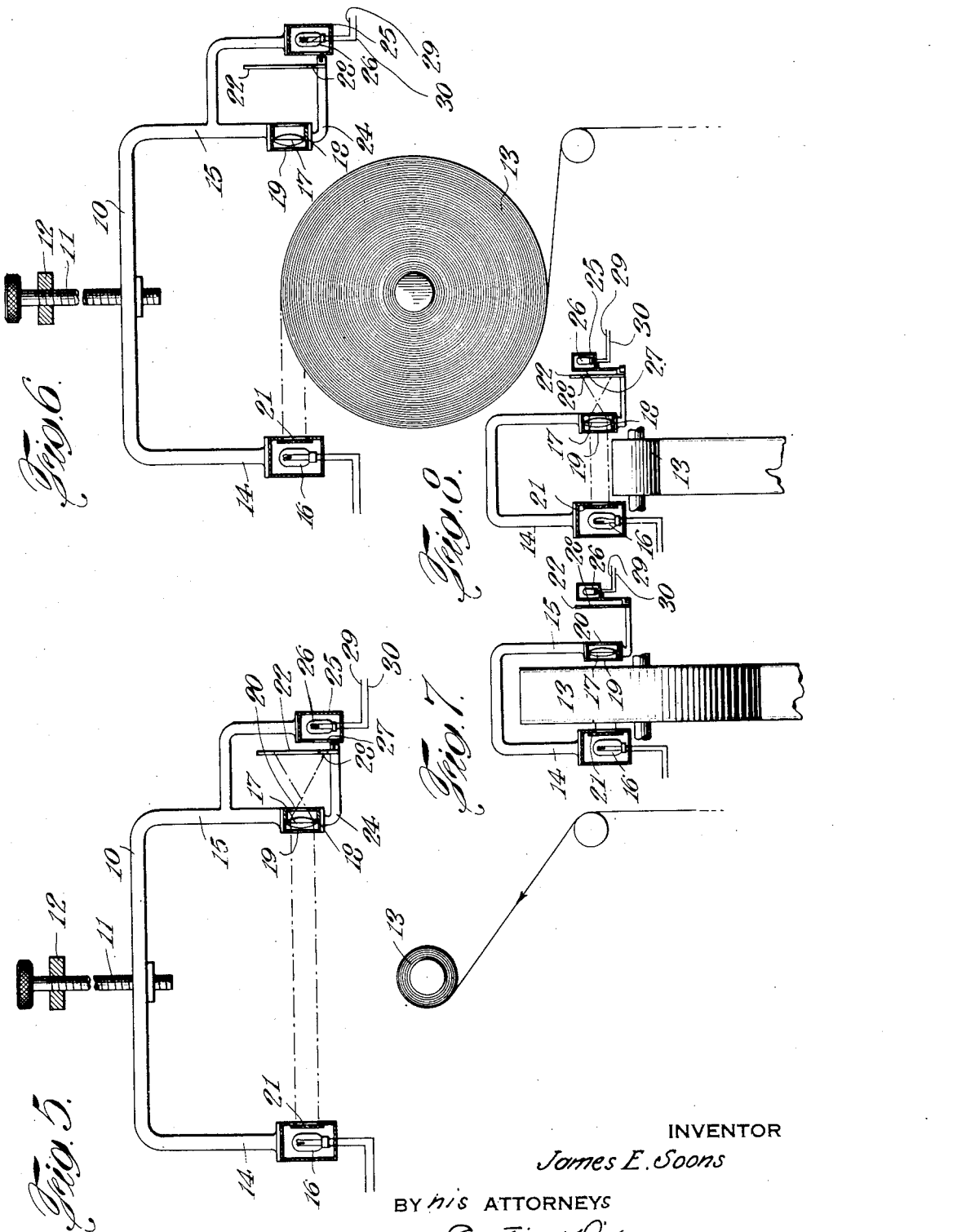

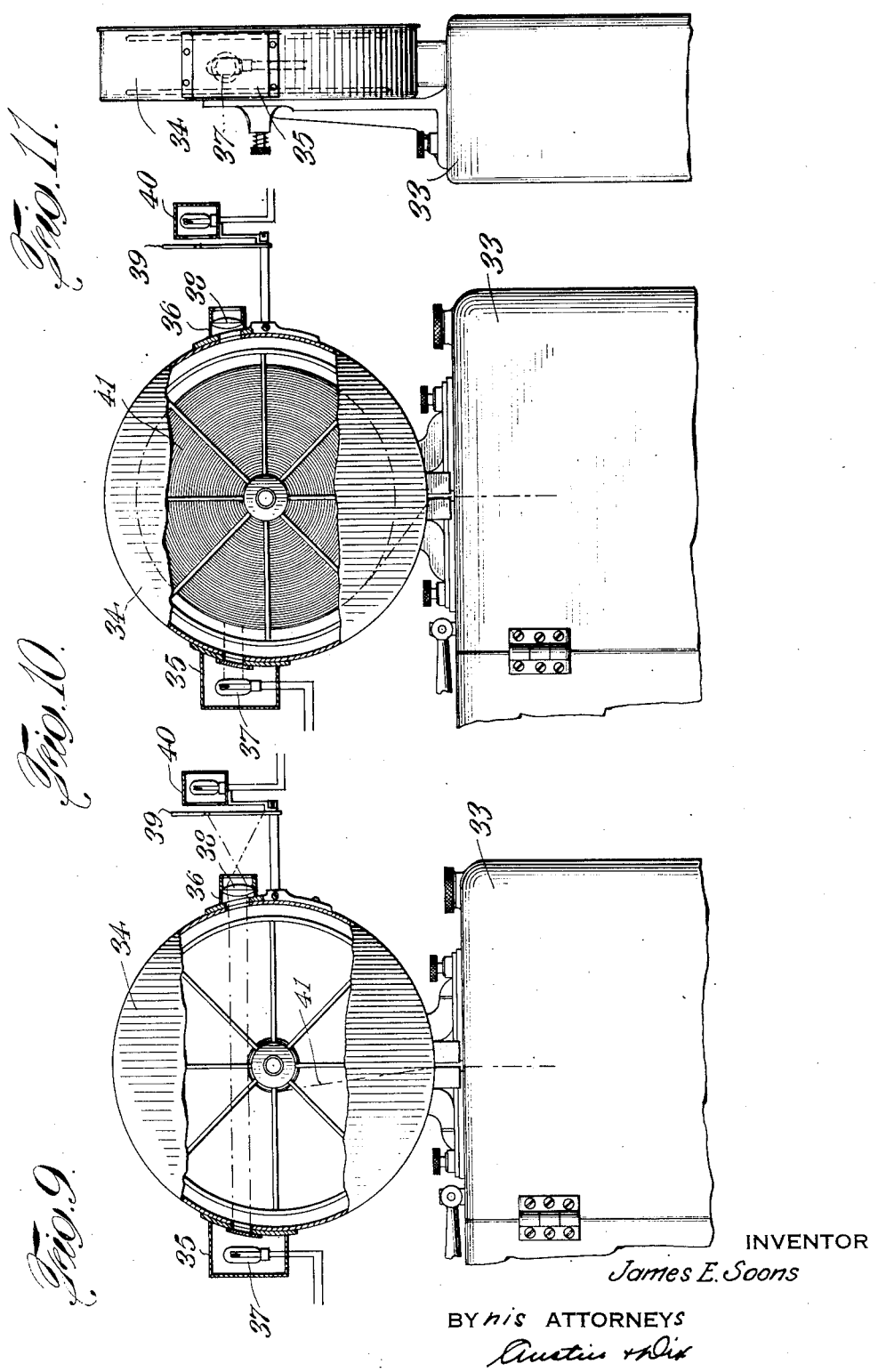

Patented Jan. 15, 1935

1,988,255

UNITED STATES PATENT OFFICE 1,988,255

INDICATING AND OPERATING MECHANISM

James E. Soons, Yonkers, N. Y., assignor to Hoffman-Soons Electrical and Engineering Corporation, New York, N. Y., a corporation of New York Application April 23, 1931, Serial No. 532,179

3 Claims. (Cl. 33—125)

This invention relates to new and useful apparatus and method for reeling and unreeling devices and has especial reference to the provision of a simple and efficient device for indicating the amount of material on the roll.

A main object of the invention is to provide a simple, compact, efficient and durable construction to be associated with material being rolled up or unrolled which will permit the operator of the device to know when the proper amount of material has been wound on the reel or to know when the material has been sufficiently unwound from a reel.

A further object is to provide simple and efficient means whereby the winding on or unwinding from a reel of material may be indicated automatically by means of a suitable signal, or may be controlled automatically by optical means activated at predetermined intervals to open and close circuits or to operate suitable gearing to thereby control the winding or unwinding.

A further object is to provide a simple and compact device which may be attached to a motion picture machine or a battery of machines such as projectors so that as the film in one projector becomes unwound to the proper point a signal is activated and suitable apparatus energized manually or automatically to stop the one machine and to start the other.

Further and more specific objects, features and advantages will more clearly appear from a consideration of the description hereinafter taken in connection with the accompanying drawings which form part of the specification and which illustrate a present preferred form of the invention.

The invention, briefly and when considered from a general viewpoint, comprises a device for reeling material or unreeling it with means, preferably optical, disposed in association therewith normally tending to throw a beam of light across the material which beam of light is interrupted when more than a predetermined amount of material has wound up and is not interrupted when less than this amount is wound up. When the beam of light is not interrupted it falls on an indicating device such as a scale after passing through a suitable lens combination. The amount of material on the reel governs the amount of darkness or light beam on the scale, and thus the length of light beam on the scale is governed by the material on the reel. This beam falling on the scale illuminates graduations thereon, and it is desired to have the graduations calibrated in terms of the length of the material in the roll being wound or unwound. Associated with the indicator or scale there may be disposed a photo-sensitive device such as a selenium cell which receives light from said beam to activate relays to open or close circuits whereby motors may be started or stopped or gearing may be energized, or suitable mechanical and electrical operations may be effected, as desired. The position of this photo-sensitive cell with relation to the scale and the beam of light can be readily varied to make it responsive at any predetermined interval and with respect to any predetermined amount of material being wound or unwound.

The invention in a particular form is to be associated with the supply magazine of a motion picture projector so that the film when it is being unwound and only a small predetermined amount of film is left on the reel, the indicating beam of light falling on the scale will at the proper point activate the photo-sensitive device to stop the particular projecting machine and to effect the starting of another one having a full film reel. This operation is called a switch-over.

It is to be understood that while the invention may be particularly described in detail with respect to the reeling and unreeling of motion picture films, it is equally important and advantageous with respect to the winding or unwinding of many other types of material similar to film such as paper, fabric, ribbon, and in fact any sheet material which may be rolled or unrolled and which may advantageously employ this invention for the purposes set forth.

The invention as to its present preferred form is illustrated in the drawings, of which:

Fig. 1 is a somewhat diagrammatic side elevational view of a reel of material about to be unwound and associated with the improved indicating device;

Fig. 2 is a similar view showing the above-mentioned reel substantially completely unrolled;

Fig. 3 is a section taken on the line 3—3 of Fig. 1;

Fig. 4 is an elevation of the indicating scale;

Fig. 5 is a view of a reel of material about to be started on a winding operation;

Fig. 6 shows said material when the winding operation is practically completed;

Fig. 7 shows material being unwound with the indicating apparatus disposed to project the beam transversely across the reel;

Fig. 8 shows the same reel when it has been substantially completely unwound;

Fig. 9 shows the upper portion of a motion picture projector with the supply reel practically unwound at the instant when the switch-over is about to take place;

Fig. 10 shows another projector with a full supply reel about to be started by the activation of the indicating and photo-sensitive device on the other projector; and Fig. 11 is an end elevation of the upper portion of either one of the projectors shown in Figs. 9 and 10.

In Figs. 1 and 2 the general idea of the invention is shown semi-diagrammatically and involves a frame 10 which is adjustably supported through screw 11 from a support 12. This frame is associated with a roll 13 of suitable material and has dependent limbs 14 and 15 disposed on opposite sides of the roll 13. On the limb 15 is a casing 16 containing a lens unit 17. This casing 16 is provided with slots 19 and 20 in its opposite faces and preferably vertical to pass a vertical beam or vertical strip of light if and when received from the lamp 16. Preferably, a plate of ground glass 21 is disposed in a suitable opening in the casing containing the lamp 16. An indicator or scale 22 having suitable graduations 23 is mounted on an arm 24 depending from the limb 15. Also preferably disposed in back of the scale is a casing 25 containing a photo-sensitive device such as a selenium cell 26. This casing 25 has an opening 27 therein to admit light. This opening is disposed back of the hole 28 in the scale 22. The hole 28 is disposed at a desired predetermined point along the scale.

Considering the apparatus illustrated in Fig. 1, it will be apparent that as the material is unwound from the roll 13 there will come a time when the light from the lamp 16 will be able to pass across the top of the roll just tangent thereto. As shown in Fig. 2 this light will pass through the lens 17 and be refracted to the bottom of the scale. However, as the diameter of the roll decreases a greater width of beam from the lamp 16 will be allowed to pass across through the lens 17 and consequently the effect on the scale 22 will be that the beam will increase vertically. Preferably, the graduations on the scale are calibrated in terms of feet of material on the reel or roll, and the light beam as it rises on the scale will indicate the footage still left on the roll. The scale is calibrated so that the operator, therefore, may readily observe the remaining footage.

The hole 28 of the scale may be disposed at any desired point along the scale to permit light to pass therethrough and to fall on the photo-sensitive device such as the selenium cell. This cell is connected to wires 29 and 30 which may be connected to any suitable structure containing relays or other devices to be associated to shift gears, to start or stop a motor or to perform any other and further desired functions. One of the main uses of the device in the motion picture industry is to stop the operation of a motion picture projection machine when substantially all of the film has been unwound from the supply reel. In such use the wires 29 and 30 are connected to the driving motor supply line through a suitable relay in that line, and the device functions to stop the motor thereby stopping the machine. It will be noticed that the scale 22 is provided with upper and lower slots 31 and 32 so that it can be adjusted slightly to vary the position of the scale with respect to the cell 26 and with respect to the lens 17. The whole indicating device as a unit, of course, may be adjusted by means of the screw 11 so that the beam will commence to be projected across to the indicating arm in the unreeling of the material.

As shown in Figs. 5 and 6 the same combination of elements is employed but in this operation it is employed to indicate the winding operation instead of an unwinding operation. As the material on the roll increases in diameter it will gradually and increasingly intercept the wide beam of light until it reaches the point where the entire beam is cut off from the indicator. The hole in the scale opposite the photo-sensitive device can at this instant be placed at the bottom of the scale so that the light is constantly at this hole until the material on the roll increases so as to cut off all the light. The electrical circuits and the device activated thereby are connected thereto and can be so arranged that as the light is cut off from the cell the driving mechanism of the roll can be stopped or any other desired function achieved.

In Figs. 7 and 8 the indicating unit is disposed on opposite lateral sides of the roll so as to tend to project the beam transversely thereto parallel to the axis rather than at right angles to the axis as heretofore described.

As shown in Figs. 9 and 10 and 11, there is illustrated a particular embodiment of the invention in which is shown the projection head 33 of a motion picture machine with the supply reel magazine 34. On opposite sides thereof are disposed respective casings 35 and 36 containing the lamp 37 and lens unit 38 associated with the scale 39 and the photo-sensitive device 40. These elements in other respects are constructed as before and as shown in Fig. 9, the beam on the indicator or scale 39 will grow in vertical height as the film 41 has unwound to such a point that the end of the picture is reached whereupon the beam is sufficient in height to pass through the aperture in the scale and affect the photo-sensitive device 40. This device may be connected in circuit in any desired manner well known in the art with suitable relays and switches so as to stop the motor of the one machine and simultaneously start the motor of the other machine having the next part of the film therein such as it shown in Fig. 10. This general operation, therefore, will automatically and optically effect a switch-over from one machine to another in a battery of projection machines. The scales are calibrated nicely and accurately so that at any desired point in the handling of the film being projected such switch-over action may readily be effected.

It is, of course, apparent that the lamp which projects the indicating beam on the scale and the lens unit in combination with the photo-sensitive device are shown projecting the beam horizontally, either transverse to the roll or longitudinally thereof, but it will be understood that the line of travel of this beam can be made vertically or disposed in any other direction, as desired. If as shown in Figs. 7 and 8 the indicating unit projects the beam transversely across the roll, this unit may be mounted right on the magazine of the motion picture projector, in which case a reel within the magazine can be taken out through the top, if desired. Or on the other hand the scale or photo-sensitive device with the lens combination can be mounted at one side of the magazine and the beam-producing lamp can be mounted on the other side on the door and swung therewith.

The invention will thus be seen to provide a simple, durable, compact, efficient indicating device comprising means for projecting a beam of light across a certain path to be intercepted by a body of material being wound or unwound and associated with a scale on which the beam falls so as to indicate the wound or unwound condition of the material, and is optically associated with a photo-sensitive device in some instances so as to operate a signal or to effect any desired motor or driving connections. The device is simple, compact, and requires substantially no adjustment or repair after it has once been set for the particular conditions of any one job, and in the case of motion picture work acts as a very efficient and automatic switch-over device.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In combination with a roll of material being wound or unwound, an adjustable frame associated therewith, a projection lamp on said frame disposed at one side of said roll, an indicating device on said frame disposed at the other side of said roll to receive light from said lamp, said frame adapted to be adjusted at predetermined levels with respect to the roll to cause indications to be made on said indicating device as the material on the roll achieves certain predetermined levels in its winding or unwinding travel, and a photo-sensitive device associated with said indicating device to be energized by impingement of light thereon to effect desired operations relating to the movement of the roll.

2. In a device for indicating the winding or unwinding condition of rolled material, means for projecting a beam of light across said roll, a scale on the opposite side of said roll to receive said light, said scale being calibrated in terms of footage of rolled material, said scale having an aperture therein at a predetermined point and a photo-sensitive device associated with said aperture to receive light and effect desired operations when energized by the impingement of light thereon.

3. In a device for indicating the winding or unwinding condition of rolled material, means for projecting a beam of light across said roll, a scale on the opposite side of said roll to receive said light, said scale being calibrated in terms of footage of rolled material, said scale having an aperture therein at a predetermined point and a photo-sensitive device associated with said aperture to receive light and effect desired operations when energized by the impingement of light thereon, said scale being adjustably mounted relative to the light and photo-sensitive device, said light and said scale and said photo-sensitive device mounted for adjusting the level of these elements with respect to the rolled material.

JAMES E. SOONS.